US011158048B2

(12) United States Patent
Peng et al.

(10) Patent No.: US 11,158,048 B2
(45) Date of Patent: Oct. 26, 2021

(54) CT LYMPH NODE DETECTION SYSTEM BASED ON SPATIAL-TEMPORAL RECURRENT ATTENTION MECHANISM

(71) Applicant: SHANDONG UNIVERSITY OF SCIENCE AND TECHNOLOGY, Qingdao (CN)

(72) Inventors: Haixin Peng, Qingdao (CN); Yingran Ma, Qingdao (CN); Yuanhong Wang, Qingdao (CN); Yanjun Peng, Qingdao (CN); Xinming Lu, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 16/957,305

(22) PCT Filed: Oct. 21, 2019

(86) PCT No.: PCT/CN2019/112219
§ 371 (c)(1),
(2) Date: Jun. 23, 2020

(87) PCT Pub. No.: WO2020/258611
PCT Pub. Date: Dec. 30, 2020

(65) Prior Publication Data
US 2020/0410671 A1    Dec. 31, 2020

(30) Foreign Application Priority Data

Jun. 28, 2019  (CN) .......................... 201910570878.1

(51) Int. Cl.
*G06K 9/00* (2006.01)
*G06T 7/00* (2017.01)
(Continued)

(52) U.S. Cl.
CPC ............ *G06T 7/0012* (2013.01); *G06N 3/084* (2013.01); *G06N 7/005* (2013.01); *G06N 20/10* (2019.01);
(Continued)

(58) Field of Classification Search
None
See application file for complete search history.

(56) References Cited

U.S. PATENT DOCUMENTS

2019/0295252 A1*  9/2019  Fuchs .................... G06N 20/00

FOREIGN PATENT DOCUMENTS

CN          110335261          10/2019

OTHER PUBLICATIONS

Min ("Deep learning in bioinformatics", Briefings in Bioinformatics, 18(5), 2017, 851-869) (Year: 2017).*
(Continued)

*Primary Examiner* — Wei Wen Yang
(74) *Attorney, Agent, or Firm* — Hauptman Ham, LLP

(57) ABSTRACT

The present disclosure discloses a CT lymph node detection system based on a spatial-temporal recurrent attention mechanism and specifically relates to the field of medical image analysis technologies. Based on a deep convolutional neural network and a recurrent attention mechanism, the present disclosure can construct an attention feature map adaptive to a lesion size in a slice direction and a spatial direction of a lymph node CT sequence. Firstly, a high-level spatial feature corresponding to the lymph node CT image is extracted by use of a pre-trained convolutional network; secondly, a recurrent attention mechanism based on a Gaussian Kernel Function is constructed with a slice at the center of the lymph node as a reference in a spatial domain; based on this, a temporal (slice direction) attention mechanism based on a Gaussian Mixture Model is performed; in addi-
(Continued)

tion, a predicted attention position is constrained based on the prior information of position distribution of the lymph node in the CT slice sequence; finally, in combination with the high-level features extracted by the two attention methods, the recurrent neural network performs classification to obtain a lymph node detection result.

3 Claims, 6 Drawing Sheets

(51) Int. Cl.
    *G06T 7/70*     (2017.01)
    *G06N 3/08*     (2006.01)
    *G06N 7/00*     (2006.01)
    *G06N 20/10*     (2019.01)

(52) U.S. Cl.
    CPC ...... *G06T 7/70* (2017.01); *G06T 2207/10081* (2013.01); *G06T 2207/20021* (2013.01); *G06T 2207/20076* (2013.01); *G06T 2207/20081* (2013.01); *G06T 2207/20084* (2013.01); *G06T 2207/30096* (2013.01)

(56) References Cited

OTHER PUBLICATIONS

BenTaieb ("Predicting Cancer with a Recurrent Visual Attention Model for Histopathology Images", Medical Image Computing and Computer Assisted Intervention—MICCAI 2018 pp. 129-137) (Year: 2018).*
Kooi ("Classifying symmetrical differences and temporal change for the detection of malignant masses in mammography using deep neural networks", J Med Imaging (Bellingham). Oct. 2017; 4(4): 044501., pp. 1-21 (Year: 2017).*
International search report dated Dec. 31, 2019 from corresponding application No. PCT/CN2019/112219.
Written Opinion dated Dec. 31, 2019 from corresponding application No. PCT/CN2019/112219.
The First search report dated Dec. 14, 2019 from corresponding application No. CN 201910570878.1.
Office Action dated Dec. 14, 2019 from corresponding application No. CN 201910570878.1.
Notice to Grant Patent Right for Invention dated Mar. 19, 2020 from corresponding application No. CN 201910570878.1.

* cited by examiner

| Category | mediastinal lymph node | | celiac lymph node | |
|---|---|---|---|---|
| Model | AUC | TPR/3FP | AUC | TPR/3FP |
| CifarNet | 0.91 | 0.70 | 0.81 | 0.44 |
| AlexNet-ImNet | 0.89 | 0.63 | 0.80 | 0.41 |
| AlexNet-RI-H | 0.94 | 0.79 | 0.92 | 0.67 |
| AlexNet-TL-H | 0.94 | 0.81 | 0.92 | 0.69 |
| GoogLeNet-RI-H | 0.85 | 0.61 | 0.80 | 0.48 |
| GoogLeNet-TL-H | 0.94 | 0.81 | 0.92 | 0.70 |
| AlexNet-RI-L | 0.94 | 0.77 | 0.88 | 0.61 |
| GoogLeNet-RI-L | 0.95 | 0.85 | 0.91 | 0.69 |
| model of the present disclosure | 0.95 | 0.87 | 0.92 | 0.82 |

FIG.9

CT LYMPH NODE DETECTION SYSTEM BASED ON SPATIAL-TEMPORAL RECURRENT ATTENTION MECHANISM

RELATED APPLICATIONS

The present application is a National Phase of International Application Number PCT/CN2019/112219, filed Oct. 21, 2019, and claims priority to Chinese Application Number 201910570878.1 filed Jun. 28, 2019.

TECHNICAL FIELD

The present disclosure relates to the field of medical image analysis technologies, and in particular to a CT lymph node detection system based on spatial-temporal recurrent attention mechanism.

BACKGROUND

Considering the special imaging features of medical images, when a deep learning model is applied to the medical image analysis field, the model is usually influenced by different sizes, shapes, dimensions, imaging qualities, and background tissue organs and so on of medical analysis target. Therefore, the analysis accuracy is to be improved.

A visual attention mechanism may simulate a specific attention mechanism of human eyes for visual information and can accurately locate a region of interest, thereby further solving the influence of irrelevant information on the model. In view of this, the present disclosure applies a conventional deep visual attention model oriented to natural images to lymph node CT sequence images to perform true and false positive classification for a lymph node so as to improve the accuracy of the deep learning method in detection of lesions.

SUMMARY

To overcome the shortcomings as above, the present disclosure provides a CT lymph node detection system based on recurrent attention mechanism in a visual attention process fusing two dimensions, i.e. space direction and slice direction based on Gaussian Kernel Function and mixture density network in accordance with sequence features of CT images.

The present disclosure adopts the following technical solution.

The CT lymph node detection system based on spatial-temporal recurrent attention mechanism includes a training sample extracting module, a deep layer feature extracting network, a feature embedding network, and a spatial-temporal recurrent attention target detection module. The detection includes the following steps.

At step 1, position coordinate information is marked for the obtained lymph node dcm-format file and a corresponding lymph node by use of the training sample extracting module, and a CT slice image block sequence $I_i$ (i=1, 2, ... ,L), $I_i \in \mathbb{R}^{W \times H}$ with CT slice image blocks being length L, width W and height H is extracted for each lymph node by using a pydicom module in python.

At step 2, a high-level spatial feature map sequence corresponding to the CT slice image block sequence of each lymph node is extracted by using a VGG-16 model pre-trained by the natural image according to the deep layer feature extracting network, and denoted as $\{X_0, \ldots, X_L\}$.

At step 3, the feature embedding network is constructed to perform dimension reduction for the input high-level feature map sequence and output a feature map $A_i$.

At step 4, a spatial-temporal recurrent attention frame is constructed, and a spatial attention mechanism is performed based on a recurrent neural network and the Gaussian Kernel Function to obtain a spatial attention result $g_S^{(t)}$.

At step 5, a temporal attention mechanism is performed for the spatial attention result $g_S^{(t)}$ obtained at step 4 to obtain a spatial-temporal attention feature $\hat{g}^{(t)}$.

At step 6, a lymph node positive score $\hat{y}_t$ of the recurrent attention iteration step is predicted by using the recurrent neural network constructed at step 4 in combination with the spatial-temporal attention feature $\hat{g}^{(t)}$ obtained at step 5.

At step 7, a loss function of the model is constructed to perform steps 4-6 for T times, and supervised training is performed for the model by using a gradient back propagation algorithm.

At step 8, iterative training is performed for the model by repeating steps 3-7, until a trained model is obtained at the end of training.

At step 9, the lymph node CT sequence to be detected is input to perform a model reasoning process, and a positive score $\hat{y}_T$ output by the final recurrent attention is taken as a CT lymph node detection result.

Preferably, the step 4 specifically includes the following steps:

At step 4.1, a long short-term memory network of two layers is constructed.

At step 4.2, the state of the long short-term memory network is initialized by constructing an encoding process of the feature map.

At step 4.3, a spatial attention position within a range of the feature map is predicted by using a sending network.

At step 4.4, an attention matrix $l^{(t)}$ is constructed based on a two-dimension Gaussian Kernel Function.

At step 4.5, $l^{(t)}$ is multiplied by A, element by element and then added up so as to obtain the spatial attention result $g_S^{(t)}$.

Preferably, at step 4.1, the recurrent neural network is constructed based on the long short-term memory network of two layers and a hidden layer is expressed as in the formula (1) below.

$$h_t^{(1)} = R_{recur}(\hat{g}^{(t)}, h_{t-1}^{(1)} | W_{r1})$$

$$h_t^{(2)} = R_{recur}(h_t^{(1)}, h_{t-1}^{(2)} | W_{r2}) \qquad (1)$$

In the above formula, $R_{recur}(\bullet)$ corresponding to $h_t^{(1)}$ is expanded as the following formula (2):

$$\begin{pmatrix} i_t \\ f_t \\ o_t \\ g_t \end{pmatrix} = \begin{pmatrix} \sigma \\ \sigma \\ \sigma \\ \tanh \end{pmatrix} M\begin{pmatrix} h_{t-1}, \\ \hat{g}^{(t)} \end{pmatrix}, c_t = f_t ec_{t-1} + i_t eg_t, \qquad (2)$$

$$h_t = o_t e\tanh(c_t)$$

In the above formula, $i_t$, $f_t$ and $o_t$ represent an input gate, a forget gate and an output gate respectively; $c_t$ and $li_t$ represent a cell state and a hidden layer state respectively; $\hat{g}^{(t)}$ represents a feature vector input into the long short-term memory network by the t-th step of attention mechanism; M: $a \to b$ is an affine transformation composed of trainable parameters, a=d+E, b=4d; d is the same vector dimension corresponding to $i_t$, $f_t$, $o_t$, $g_t$, $c_t$ and $h_t$, E is a dimension of an input feature subjected to dimension reduction, and $R_{recur}(\bullet)$ corresponding to $h_t^{(2)}$ is obtained by replacing $\hat{g}^{(t)}$ in the above $R_{recur}(\bullet)$ with $h_t^{(1)}$.

Preferably, step 4.2 specifically includes the following steps:

At step 4.2.1, a new double-layer long short-term memory network (LSTM) having the same structure as formula (1) is constructed.

At step 4.2.2, the feature map $A_{mid}$ corresponding to the exact center of a CT slice sequence of each lymph node at step 3 is divided according to a spatial neighborhood; specifically, 8×8×200 are divided into 16 sub-feature blocks with 2×2×200 based on adjacent four positions as one group.

At step 4.2.3, the 16 sub-feature blocks are input into the new double-layer long short-term memory network sequentially clockwise from outside to inside and subjected to 16 cycles to obtain a cell state $c'^{(2)}_T$ corresponding to the second layer of the LSTM at the last moment so as to initialize the cell state $c_0^{(2)}$ of the second layer of the long short-term memory network at step 4.1.

Preferably, the step 4.3 specifically includes the following steps:

At step 4.3.1, a feature vector $h_t^{(2)}$ output by the first hidden layer of the long short-term memory network and a feature result $g_{S,Center}^{(t)}$ corresponding to the center of the slice sequence in the recurrent attention iteration step are concatenated to obtain $[h_t^{(2)}, g_{S,Center}^{(t)}]$.

At step 4.3.2, $[h_t^{(2)}, g_{S,Center}^{(t)}]$ is input to the sending network composed of one fully-connected layer to perform regression for the spatial attention position of the next recurrent iteration step as shown in the formula (3):

$$(\mu_S^{(t+1)}, \sigma_S^{(t+1)}) = \sigma(W_S[h_t^{(2)}, g_{S,Center}^{(t)}] + b_X) \quad (3)$$

In the above formula, $\mu_S^{(t+1)} = (\mu_{S,x}^{(t+1)}, \mu_{S,y}^{(t+1)})$ represents an attention position coordinate predicted at the t+1 moment, where a variance $\sigma_S^{(t+1)}$ of the Gaussian Kernel Function is set to a fixed value 0.1, thus, $W_S \in \mathbb{R}^{2\times(R+E)}$, $b_S \in \mathbb{R}^{2\times1}$ only corresponds to two output nodes.

Preferably, at step 4.4, after an attention position coordinate $\mu_S^{(t)}$ is obtained, an attention template matrix is constructed based on the two-dimension Gaussian Kernel Function and softmax as shown in the following formula (4):

$$l_i^{(t)} = p(L_t = i | \mu_S^{(t)}, \sigma_S^{(t)}) \quad (4)$$
$$= softmax(\phi(l_i | \mu_S^{(t)}, \sigma_S^{(t)}))$$
$$= \frac{\exp(\phi(l_i | \mu_S^{(t)}, \sigma_S^{(t)}))}{\sum_{j=1}^{K^2} \exp(\phi(l_j | \mu_S^{(t)}, \sigma_S^{(t)}))}$$

In the above formula, $\phi(l_i | \mu_S^{(t)}, \sigma_S^{(t)}) = C \cdot \exp(l_i - \mu_S^{(t)})/2\sigma_S^{(t)}$, $l_i = \{(x_i, y_l)\}_{j=1}^{K \times K}$ is discrete equidistant position coordinates normalized to the interval [0, 1] within the range $A_i$; C is Gaussian normalized constant which is a fixed value 10.

Preferably, the step 5 specifically includes the following steps:

At step 5.1, a mixture density network is constructed to predict an attention position $\mu_T^{(t)}$ of a slice direction.

At step 5.2, an attention weight vector $l'^{(t)}$ obtained based on Gaussian Mixture Distribution.

At step 5.3, $l'^{(t)}$ and the input feature $g_S^{(t)}$ are multiplied element by element and added up to obtain the spatial-temporal attention feature $\hat{g}^{(t)}$.

Preferably, the step 5.1 specifically includes the following steps:

At step 5.1.1, the sequence feature $g_S^{(t)}$ corresponding to each lymph node is equally divided into left and right halves, that is $g_{Left}^{(t)}$ and $g_{Right}^{(t)}$.

At step 5.1.2, the mixture density network is formed by one fully-connected hidden layer to perform regression for the temporal attention position coordinate and the Mixture Gaussian Function parameters as shown in the following formula (5):

$$Z^{(t)} = \sigma(W_T g_{S/2}^{(t)} + b_T) \quad (5)$$

In the above formula, $g_{S/2}^{(t)} \in \mathbb{R}^{E \cdot L/2}$ represents the left half or the right half of $g_S^{(t)}$; $W_T \in \mathbb{R}^{2C \times E \cdot L/2}$, $b_T \in \mathbb{R}^{2C \times 1}$ represents a training parameter of the mixture density network, C represents a component number of the Gaussian Mixture Model respectively corresponding to the left half and the right half of the sequence feature, and $\sigma$ is sigmoid function.

At step 5.1.3, respective regression coefficients $Z_{Left}^{(t)} \in \mathbb{R}^{2C \times 1}$ and $Z_{Right}^{(t)} \in \mathbb{R}^{2C \times 1}$ of the left half and the right half are both distributed to the Gaussian Mixture Model according to a rule of $Z_{0: C-1}^{(t)} \to \pi_T^{(t)}$ and $Z_{C: 2C-1}^{(t)} \to \mu_T^{(t)}$.

At step 5.1.4, with the formula (6), $\mu_{Left}$ is limited to [0, 0.5) and $\mu_{Right}$ is limited to (0.5, 1].

$$\mu_{Left} \leftarrow \mu_{Left} \times 0.5, \mu_{Right} \leftarrow 0.5 \times (1 + \mu_{Right}) \quad (6)$$

Preferably, the step 5.2 specifically includes the following steps:

At step 5.2.1, the coefficient $\pi_T^{(t)}$ of each Gaussian component is normalized with softmax, that is, $\pi_T^{(t)} \leftarrow softmax(\pi_T^{(t)})$, and the variance $\Sigma_T^{(t)}$ of all Gaussian components is fixed as 0.1.

At step 5.2.2, in combination with the Gaussian Mixture Model parameters $(\pi_T^{(t)}, \mu_T^{(t)}, \Sigma_T^{(t)})$ derived from the slice feature vectors of the left and right halves, a corresponding temporal attention weight vector $l'^{(t)}_i$ is obtained based on the formula (7).

$$l'^{(t)}_i = p\left(L_t = i | \pi_T^{(t)}, \mu_T^{(t)}, \sum_T^{(t)}\right) \quad (7)$$
$$= softmax\left(N\left(l_i | \pi_T^{(t)}, \mu_T^{(t)}, \sum_T^{(t)}\right)\right)$$
$$= \frac{\exp\left(N\left(l_i | \pi_T^{(t)}, \mu_T^{(t)}, \sum_T^{(t)}\right)\right)}{\sum_{j=1}^{L} \exp\left(N\left(l_j | \pi_T^{(t)}, \mu_T^{(t)}, \sum_T^{(t)}\right)\right)}$$

In the above formula, N is a Gaussian mixture density function.

$$N(l_i | \pi_T^{(t)}, \mu_T^{(t)}, \Sigma_T^{(t)}) = \Sigma_{c=1}^{C} \pi_{T,c}^{(t)} \phi_c(l_i | \mu_{T,c}^{(t)}, \Sigma_{T,c}^{(t)}), \quad s.t. \Sigma_{c=1}^{C} \pi_{T,c}^{(t)} = 1 \phi_c(l_i | \mu_{T,c}^{(t)}, \Sigma_{T,c}^{(t)}) = C \cdot \exp(l_i - \mu_{T,c}^{(t)})/2\Sigma_{T,c}^{(t)} \quad (8)$$

Preferably, at step 7, a target function for the model to receive supervised training is obtained in the following steps:

At step 7.1, a classification loss function is constructed; and cross-entropy loss functions corresponding to all recurrent attention iteration steps are investigated as shown in the following formula (9):

$$F_c = -\sum_{t=1}^{T} \sum_{i=1}^{2} y_i \log \hat{y}_{t,i} \quad (9)$$

In the above formula, $y_i$ and $\hat{y}_{t,i}$ are a real lymph node positive score and a predicted lymph node positive score, which are a total number of the recurrent attention iterations.

At step 7.2, a constraint term of a predicted position of the spatial attention mechanism is constructed in the following two steps:

At step 7.2.1, a "convergent" constraint term of the position is constructed, and the predicted spatial attention position is constrained to around the center of the feature map based on Batch Normalization and the prior information of the lymph node being at the center of the slice, as shown in the following formula (10):

$$\min(\Sigma_{i=1}^{d}(\gamma_i-1)^2+\beta_i^2) \qquad (10)$$

In the above formula, $\hat{y}_i \leftarrow \gamma \hat{x}_i + \beta$, (i=1, ..., m), $$\hat{x}_i \leftarrow \frac{x_i - \mu_B}{\sqrt{\sigma_B^2 + \varepsilon}} \Leftrightarrow \hat{X} = A^T(X - B)$$

In the above formulas, $\beta$ and $\gamma$ are trainable parameters introduced by the Batch Normalization; d is an output dimension of the sending network; and m is a batch sample capacity.

At step 7.2.2, a "divergent" constraint term of the position is constructed; the uniformly-distributed cross-entropy loss functions are constructed according to different positions predicted in the entire recurrent attention process, as shown in the following formula (11):

$$F_S = \text{Const} - \Sigma_{t=1}^T P_{Unif} \log[\text{softmax}(\mu_S^{(t)})] \qquad (11)$$

In the above formula, $P_{Unif}$: Uniform $(0, K^2)$ represents a uniform distribution within a spatial range of the feature map; the constant Const is set to 1.

At step 7.3, a constraint term of a predicted position of the temporal attention mechanism is constructed; the "convergent" constraint term is applied to the predicted position, the batch normalization layer is also introduced to the mixture density network and the formula (10) is minimized so that the attention positions of the left and right halves in the direction of slice $\mu_T^{(t)} \sim (0.25, 0.75)$.

At step 7.4, a final entire loss function of the model is constructed as shown in the following formula (12):

$$F = -\sum_{t=1}^T \sum_{i=1}^2 y_i \log \hat{y}_{t,i} + \lambda_1 \left( \sum_{i=1}^d (\gamma_i - 1)^2 + \beta_i^2 \right) + \lambda_2 \left( \text{Const} - \sum_{t=1}^T p_{Unif} \log[\text{softmax}(\mu_S^{(t)})] \right) \qquad (12)$$

The present disclosure has the following beneficial effects.

In the present disclosure, the lymph node CT image high-level spatial feature is weight-extracted by use of the recurrent attention mechanism to self-adaptively process 3D lesion voxel information without introducing external position label information. The present disclosure is based on the Gaussian Kernel Function with the model being small in scale, derivable entirely and easy to train with back propagation algorithm. The present disclosure brings an ideal lymph node detection result and thus has good technical value and good application prospect.

BRIEF DESCRIPTION OF THE DRAWINGS

FIG. 9 is a diagram of performance comparison of the present disclosure and other models.

DETAILED DESCRIPTION OF THE EMBODIMENTS

Figure 1:
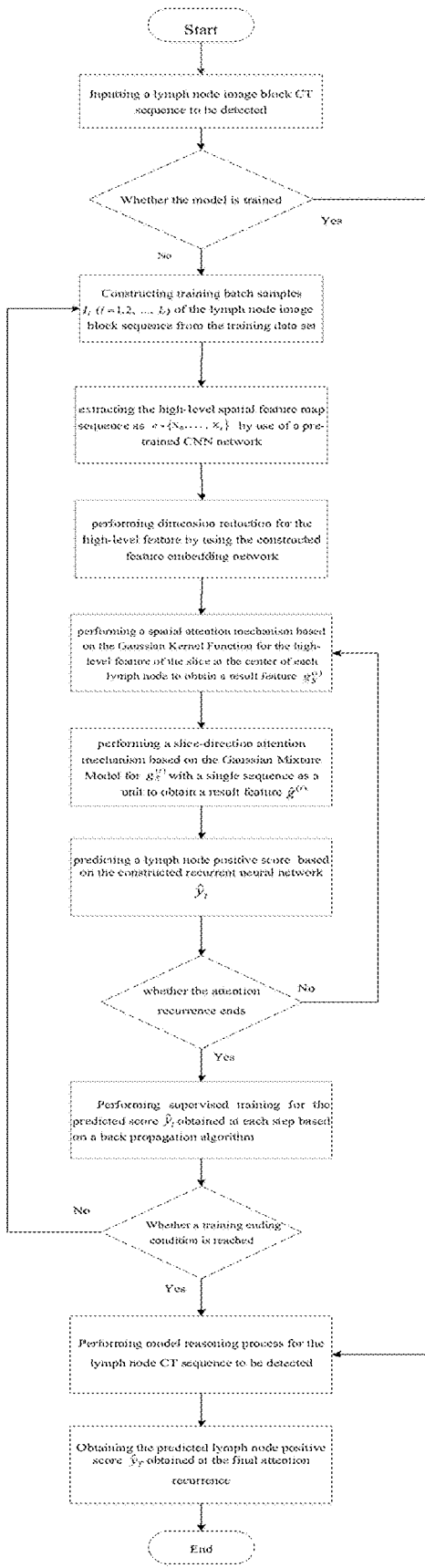
FIG. 1 is a flowchart of a method according to the present disclosure.
Figure 2:
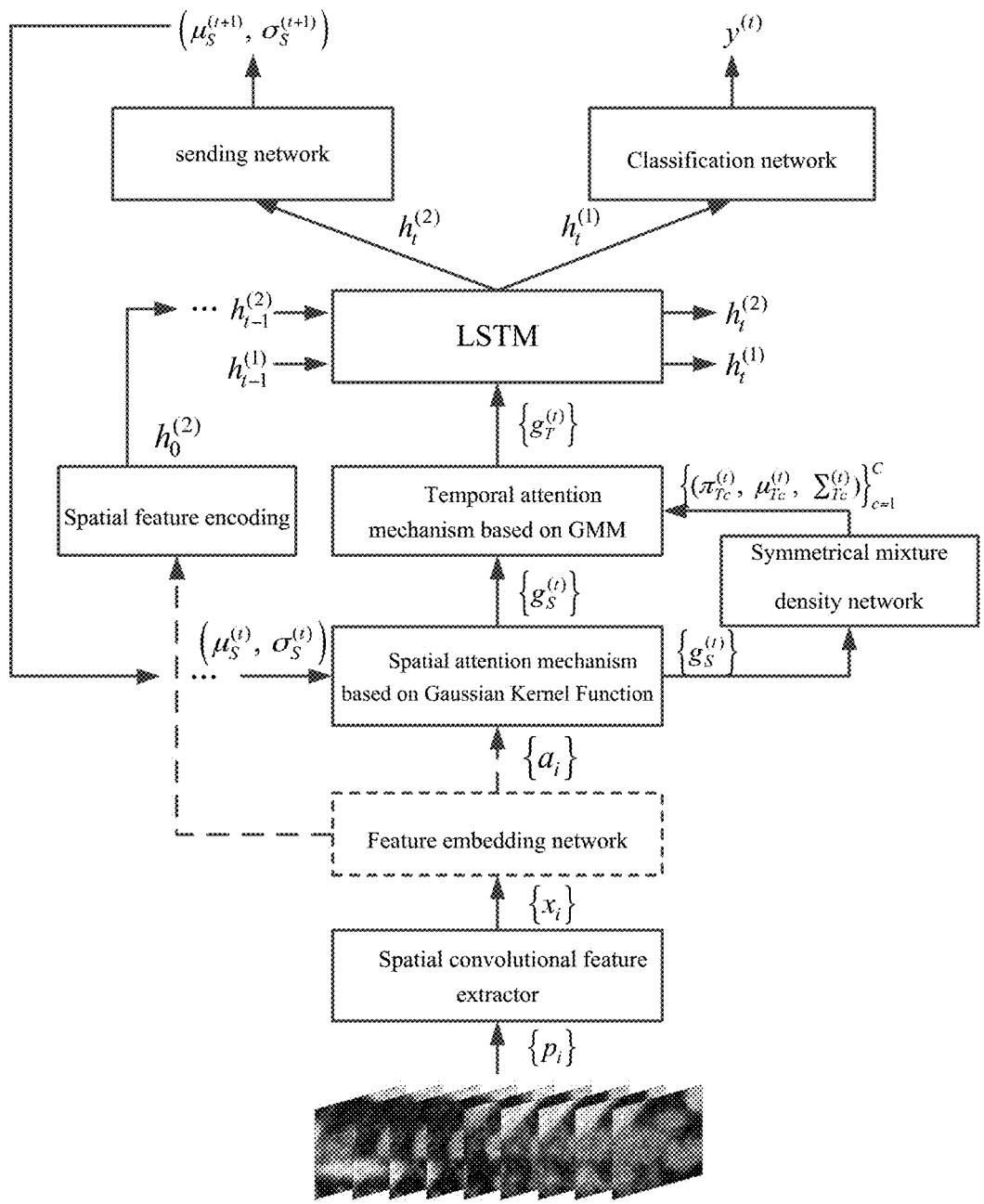
FIG. 2 is a structural diagram of each part of the present disclosure.
Figure 3:
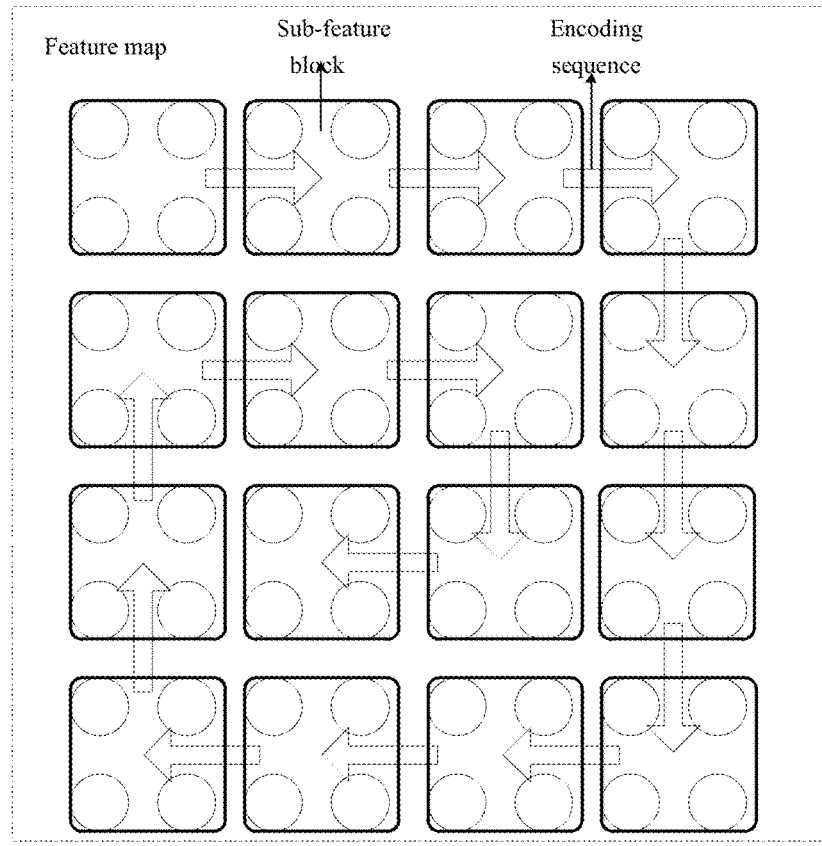
FIG. 3 is a schematic diagram of a code sequence of a feature map.
Figure 4:
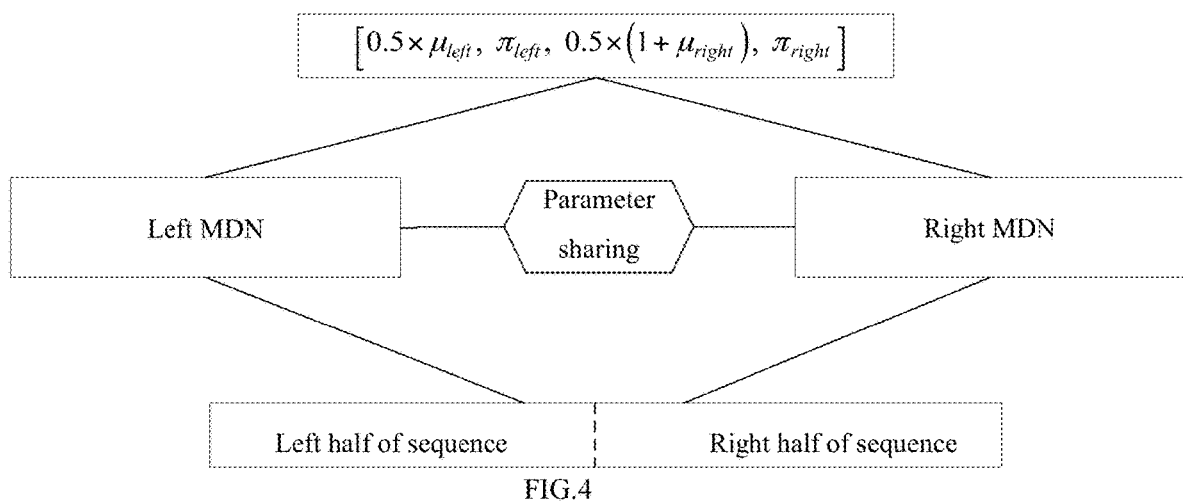
FIG. 4 is a structural diagram of symmetrical mixed density networks.
Figure 5:
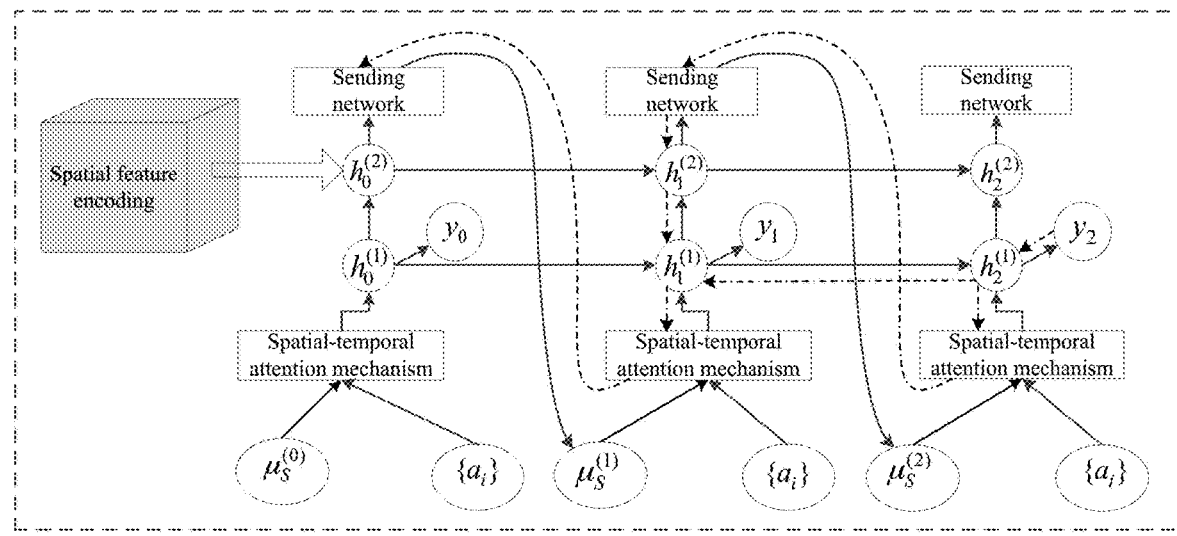
FIG. 5 is a schematic diagram of backward and forward propagation of a recurrent neural network during a training stage.

The specific implementations of the present disclosure will be further described below in combination with accompanying drawings and specific examples.

To overcome the influence of different lymph node lesion regions and complex background on a detection result, the present disclosure provides a detection system based on recurrent attention mechanism in a visual attention process fusing two dimensions, i.e. space direction and slice direction based on Gaussian Kernel Function and mixture density network in accordance with sequence features of CT images. Further, the predicted spatial-temporal attention position is constrained based on prior distribution of lesion region positions.

In combination with the accompanying drawings, there is provided a CT lymph node detection system based on a spatial-temporal recurrent attention mechanism, including a training sample extracting module, a deep layer feature extracting network, a feature embedding network and a spatial-temporal recurrent attention target detection module. The detection process includes the following steps:

At step 1, position coordinate information is marked for the obtained lymph node dcm-format file and a corresponding lymph node by use of the training sample extracting module, and a CT slice image block sequence $I_i$ (i=1, 2, ..., L), $I_i \in \mathbb{R}^{W \times H}$, with CT slice image blocks being length L, width W and height H is extracted for each lymph node by using a pydicom module in python.

A data set used herein is a CT lymph node data set provided by The Cancer Imaging Archive (TCIA). The data set contains 389 mediastinal lymph nodes of 90 patients, 3208 false positive samples corresponding to the mediastinal lymph nodes, 595 celiac lymph nodes of 86 patients and 3484 false positive samples corresponding to the celiac lymph nodes. According to the prior statistic information of the CT lymph nodes, the extracted CT slice sequence length corresponding to each lymph node: L=9, that is, a sequence is formed by extracting four adjacent slices forward and backward respectively with the center of each lymph node as a symmetrical axis. Further, W=H=32 is fixed. In the spatial domain, the center of the image block corresponds to the position coordinate marked for the CT lymph node.

At step 2, a high-level spatial feature map sequence corresponding to the CT slice image block sequence of each lymph node is extracted by using a VGG-16 model pre-trained by a natural image according to the deep layer feature extracting network, and denoted as $\{X_0, ..., X_L\}$.

The pre-trained CNN model is an Inception-V3 model trained based on an ImageNet data set. Further, the penultimate convolutional layer of the high-level feature is selected and the extracted feature dimensions are 8×8×1280.

At step 3, the feature embedding network is constructed to perform dimension reduction for the input high-level feature map sequence and output a feature map $A_i$.

The constructed feature embedding network is composed of one fully-connected layer, i.e. 1×1 convolution, and the output dimension is set to 200. A dimension reduction process of a single feature map is as shown in the following formula (13):

$$A_i = \tanh(W_{Em}X_i + b) \quad (13)$$

In the above formula, $W_{Em} \in \mathbb{R}^{E \times D}$, $b \in \mathbb{R}^{E \times 1}$ are training $A_i \in \mathbb{R}^{K \times E}$ is a feature map subjected to dimension reduction, where E=200 and K=8.

At step 4, a spatial-temporal recurrent attention frame is constructed, and a spatial attention mechanism is performed based on a recurrent neural network and the Gaussian Kernel Function to obtain a spatial attention result $g_S^{(t)}$.

Preferably, the step 4 specifically includes the following steps:

At step 4.1, a long short-term memory network (LSTM) of two layers is constructed.

At step 4.1, the recurrent neural network is constructed based on the long short-term memory network of two layers and a hidden layer is expressed as in the formula (1) below.

$$h_t^{(1)} = R_{recur}(\hat{g}^{(t)}, h_{t-1}^{(1)} | W_{r1})$$

$$h_t^{(2)} = R_{recur}(h_t^{(1)}, h_{t-1}^{(2)} | W_{r2}) \quad (1)$$

In the above formula, $R_{recur}(\bullet)$ corresponding to $h_t^{(1)}$ is expanded as the following formula (2):

$$\begin{pmatrix} i_t \\ f_t \\ o_t \\ g_t \end{pmatrix} = \begin{pmatrix} \sigma \\ \sigma \\ \sigma \\ \tanh \end{pmatrix} M \begin{pmatrix} h_{t-1}, \\ \hat{g}^{(t)} \end{pmatrix},$$

$$c_t = f_t e c_{t-1} + i_t e g_t,$$

$$h_t = o_t e \tanh(c_t) \quad (2)$$

In the above formula, $i_t$, $f_t$ and $o_t$ represent an input gate, a forget gate and an output gate respectively; $c_t$ and $h_t$ represent a cell state and a hidden layer state respectively; $\hat{g}^{(t)}$ represents a feature vector input into the long short-term memory network by the t-th step of attention mechanism; $M: {}^a \to {}^b$ is an affine transformation composed of trainable parameters, a=d+E, b=4d; d is the same vector dimension corresponding to $i_t$, $f_t$, $o_t$, $g_t$, $c_t$ and $h_t$, E is a dimension of an input feature subjected to dimension reduction, and $R_{recur}(\bullet)$ corresponding to $h_t^{(2)}$ is obtained by replacing $\hat{g}^{(t)}$ in the above $R_{recur}(\bullet)$ with $h_t^{(t)}$.

At step 4.2, the state of the long short-term memory network is initialized by constructing an encoding process of the feature map.

Preferably, step 4.2 specifically includes the following steps:

At step 4.2.1, a new double-layer long short-term memory network (LSTM) having the same structure as formula (1) is constructed.

At step 4.2.2, the feature map $A_{mid}$ corresponding to the exact center of a CT slice sequence of each lymph node at step 3 is divided according to a spatial neighborhood; specifically, 8×8×200 are divided into 16 sub-feature blocks with 2×2×200 based on adjacent four positions as one group.

At step 4.2.3, the 16 sub-feature blocks are input into the new double-layer long short-term memory network sequentially clockwise from outside to inside and subjected to 16 cycles to obtain a cell state $c'_T^{(2)}$ corresponding to the second layer of the LSTM at the last moment so as to initialize the cell state $c_0^{(2)}$ of the second layer of the long short-term memory network at step 4.1.

At step 4.3, a spatial attention position within a range of the feature map is predicted based on a sendingnetwork.

The step 4.3 specifically includes the following steps:

At step 4.3.1, the feature vector $h_t^{(2)}$ output by the first hidden layer of the long short-term memory network and the feature result $g_{S,Center}^{(t)}$ corresponding to the center of the slice sequence in the recurrent attention iteration step are concatenated to obtain $[h_t^{(2)}, g_{S,Center}^{(t)}]$. Herein, let $g_{S,Center}^{(0)} = A_{Center}$.

At step 4.3.2, $[h_t^{(2)}, g_{S,Center}^{(t)}]$ is input to the sending network composed of one fully-connected layer to perform regression for the spatial attention position of the next recurrent iteration step as shown in the formula (3):

$$(\mu_S^{(t+1)}, \sigma_S^{(t+1)}) = \sigma(W_S[h_t^{(2)}, g_{S,Center}^{(t)}] + b_S) \quad (3)$$

In the above formula, $\mu_S^{(t+1)} = (\mu_{S,x}^{(t+1)}, \mu_{S,y}^{(t+1)})$ represents an attention position coordinate predicted at the t+1 moment, where the variance $\sigma_S^{(t+1)}$ of the Gaussian Kernel Function is set to a fixed value 0.1, thus, $W_S \in \mathbb{R}^{2 \times (R+E)}$, and $b_S \in \mathbb{R}^{2 \times 1}$ only corresponds to two output nodes.

At step 4.4, an attention matrix $l^{(t)}$ is constructed based on a two-dimension Gaussian Kernel Function.

At step 4.4, after the attention position coordinate $\mu_S^{(t)}$ is obtained, an attention template matrix is constructed based on the two-dimension Gaussian Kernel Function and softmax as shown in the following formula (4):

$$l_i^{(t)} = p(L_t = i | \mu_S^{(t)}, \sigma_S^{(t)})$$

$$= softmax(\phi(l_i | \mu_S^{(t)}, \sigma_S^{(t)}))$$

$$= \frac{\exp(\phi(l_i | \mu_S^{(t)}, \sigma_S^{(t)}))}{\sum_{j=1}^{K^2} \exp(\phi(l_j | \mu_S^{(t)}, \sigma_S^{(t)}))} \quad (4)$$

In the above formula, $\phi(l_i | \mu_X^{(t)}, \sigma_S^{(t)}) = C \cdot \exp(l_i - \mu_S^{(t)})/2\sigma_S^{(t)}$, $l_i = \{(x_i, y_i)\}_{j=1}^{K \times K}$ is discrete equidistant position coordinates normalized to the interval [0, 1] within the range $A_i$; C is Gaussian normalized constant which is a fixed value 10.

At step 4.5, $l^{(t)}$ is multiplied by $A_i$ element by element and added up so as to obtain the spatial attention result $g_S^{(t)}$.

At step 5, a temporal attention mechanism is performed for the spatial attention result $g_S^{(t)}$ obtained at step 4 to obtain a spatial-temporal attention feature $\hat{g}^{(t)}$.

The step 5 specifically includes the following steps:

At step 5.1, a mixture density network is constructed to predict an attention position $\mu_T^{(t)}$ of a slice direction.

The step 5.1 specifically includes the following steps:

At step 5.1.1, the sequence feature $g_S^{(t)}$ corresponding to each lymph node is equally divided into left and right halves, that is, $g_{Left}^{(t)}$ and $g_{Right}^{(t)}$.

At step 5.1.2, the mixture density network is formed by one fully-connected hidden layer to perform regression for the temporal attention position coordinate and the Mixture Gaussian Function parameters as shown in the following formula (5):

$$Z^{(t)} = \sigma(W_T g_{S/2}^{(t)} + b_T) \quad (5)$$

In the above formula, $g_{S/2}^{(t)} \in E \cdot L/2$ represents the left half or the right half of $g_S^{(t)}$; $W_T^{(t)} \in 2C \times E \cdot L/2$, $b_T \in 2C \times 1$ represents a training parameter of the mixture density network, C represents a component number of the Gaussian Mixture Model corresponding to the left half and the right half of the sequence feature, and σ is sigmoid function.

At step 5.1.3, respective regression coefficients $Z_{Left}^{(t)} \in 2C \times 1$ and $Z_{Right}^{(t)} \in 2C \times 1$ of the left half and the right half are both distributed to the Gaussian Mixture Model according to a rule of $Z_{0:\ C-1}^{(t)} \rightarrow \pi_T^{(t)}$ and $Z_{C:\ 2C-1}^{(t)} \rightarrow \mu_T^{(t)}$.

At step 5.1.4, with the formula (6), $\mu_{Left}$ is limited to [0, 0.5) and $\mu_{Right}$ is limited to (0.5, 1].

$$\mu_{Left} \leftarrow \mu_{Left} \times 0.5,\ \mu_{Right} \leftarrow 0.5 \times (1 + \mu_{Right}) \quad (6)$$

At step 5.2, an attention weight vector $l'^{(t)}$ is obtained based on Gaussian Mixture Distribution.

The step 5.2 specifically includes the following steps:

At step 5.2.1, the coefficient $\pi_T^{(t)}$ of each Gaussian component is normalized with softmax, that is, $\pi_T^{(t)} \leftarrow \text{softmax}(\pi_T^{(t)})$, and the variance $\Sigma_T^{(t)}$ of all Gaussian components is fixed as 0.1.

At step 5.2.2, in combination with the Gaussian Mixture Model parameters ($\pi_T^{(t)}$, $\mu_T^{(t)}$, $\Sigma_T^{(t)}$) derived from the slice feature vectors of the left and right halves, a corresponding temporal attention weight vector $l'_i^{(t)}$ is obtained based on the formula (7).

$$\begin{aligned} l_t'^{(t)} &= p\left(L_t = i \mid \pi_T^{(t)}, \mu_T^{(t)}, \Sigma_T^{(t)}\right) \\ &= \text{softmax}\left(N\left(l_i \mid \pi_T^{(t)}, \mu_T^{(t)}, \Sigma_T^{(t)}\right)\right) \\ &= \frac{\exp\left(N\left(l_i \mid \pi_T^{(t)}, \mu_T^{(t)}, \Sigma_T^{(t)}\right)\right)}{\sum_{j=1}^{L} \exp\left(N\left(l_j \mid \pi_T^{(t)}, \mu_T^{(t)}, \Sigma_T^{(t)}\right)\right)} \end{aligned} \quad (7)$$

In the above formula, N is a Gaussian mixture density function.

$$\begin{aligned} N(l_i \mid \pi_T^{(t)}, \mu_T^{(t)}, \Sigma_T^{(t)}) &= \sum_{c=1}^{C} \pi_{T,c}^{(t)} \phi_c(l_i \mid \mu_{T,c}^{(t)}, \Sigma_{T,c}^{(t)}),\ s.t. \sum_{c=1}^{C} \pi_{T,c}^{(t)} = 1 \phi_c(l_i \mid \mu_{T,c}^{(t)}, \Sigma_{T,c}^{(t)}) = C \cdot \exp((l_i - \mu_{T,c}^{(t)})/2\Sigma_{T,c}^{(t)}) \end{aligned} \quad (8)$$

At step 5.3, $l'^{(t)}$ and the input feature $g_S^{(t)}$ are multiplied element by element and added to obtain the spatial-temporal attention feature $\hat{g}^{(t)}$.

At step 6, a lymph node positive score $\hat{y}_t$ of the recurrent attention iteration step is predicted by using the recurrent neural network constructed at step 4 in combination with the spatial-temporal attention feature $\hat{g}^{(t)}$ obtained at step 5.

At step 7, a loss function of the model is constructed to perform steps 4-6 for T times, and supervised training is performed for the model by using a gradient back propagation algorithm.

At step 7, the target function for the model to receive supervised training is obtained in the following steps:

At step 7.1, a classification loss function is constructed; and cross-entropy loss functions corresponding to all recurrent attention iteration steps are investigated as shown in the following formula (9).

$$F_c = -\sum_{t=1}^{T} \sum_{i=1}^{2} y_i \log \hat{y}_{t,i} \quad (9)$$

In the above formula, $y_i$ and $\hat{y}_{t,i}$ are a real lymph node positive score and a predicted lymph node positive score, which are a total number of the recurrent attention iterations.

At step 7.2, a constraint term of a predicted position of the spatial attention mechanism is constructed in the following two steps:

At step 7.2.1, a "convergent" constraint term of the position is constructed, and the predicted spatial attention position is constrained to around the center of the feature map based on Batch Normalization and the prior information of the lymph node being at the center of the slice, as shown in the following formula (10):

$$\min\left(\sum_{i=1}^{d}(\gamma_i - 1)^2 + \beta_i^2\right) \quad (10)$$

where $\hat{y}_i \leftarrow \gamma \hat{x}_i + \beta,\ (i = 1, \ldots, m)$, $$\hat{x}_i \leftarrow \frac{x_i - \mu_B}{\sqrt{\sigma_B^2 + \varepsilon}} \Leftrightarrow \hat{X} = A^T(X - B)$$

In the above formula, β and γ are trainable parameters introduced by the Batch Normalization; d is an output dimension of the sending network; and m is a batch sample capacity.

At step 7.2.2, a "divergent" constraint term of the position is constructed; the uniformly-distributed cross-entropy loss functions are constructed according to different positions predicted in the entire recurrent attention process, as shown in the following formula (11):

$$F_S = \text{Const} - \sum_{t=1}^{T} P_{Unif} \log[\text{softmax}(\mu_S^{(t)})] \quad (11)$$

In the above formula, $P_{Unif}$: Uniform(0, $K^2$) represents a uniform distribution within a spatial range of the feature map; the constant Const is set to 1.

At step 7.3, a constraint term of a predicted position of the temporal attention mechanism is constructed; the "convergent" constraint term is applied to the predicted position, the batch normalization layer is also introduced to the mixture density network and the formula (10) is minimized so that the attention positions of the left and right halves in the direction of slice $\mu_T^{(t)} \approx (0.25, 0.75)$.

At step 7.4, a final entire loss function of the model is constructed as shown in the following formula (12):

$$F = -\sum_{t=1}^{T}\sum_{i=1}^{2} y_i \log \hat{y}_{t,i} + \lambda_1 \left(\sum_{i=1}^{d}(\gamma_i - 1)^2 + \beta_i^2\right) + \lambda_2 \left(\text{Const} - \sum_{t=1}^{T} p_{Unif} \log[\text{softmax}(\mu_S^{(t)})]\right) \quad (12)$$

At step 8, steps 3-7 are repeated to perform iterative training for the model until a trained model is obtained at the end of training.

The training data is formed by the true and false positive samples in the same proportion. The model adopts three cross-validations during a test. The parameters of the model are set according to the following values: 1. in the formula (12), $\lambda_1 = 1$ and $\lambda_2 = 0.5$; 2. The number of recurrences of the recurrent attention mechanism for each time T=8;(3) in the formula (5), the component number of Gaussian Mixture Model respectively corresponding to the left and right halves of sequence: C=1, that is, there are totally three components, each of which corresponds to three parts, i.e. left, middle and right subparts; (4)the capacity of training batch samples is 20, the initial learning rate is set to 0.1 with reduction of 0.1 for each 25 periods in a total 200 training periods.

At step 9, the lymph node CT sequence to be detected is input to perform model reasoning process and the positive score $\hat{y}_T$ output by the final recurrent attention is taken as the CT lymph node detection result.

Figure 6:
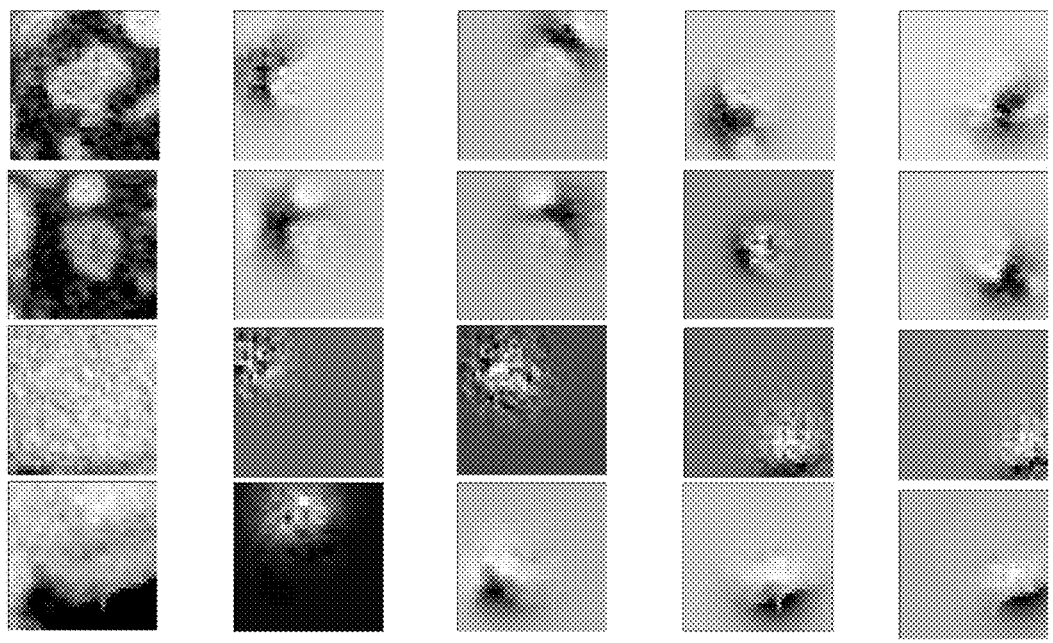
FIG. 6 is an instance diagram of performing a spatial attention mechanism.

FIG. 6 is an instance diagram of performing a spatial attention mechanism. It can be seen that the attention position is accurately located near the boundary of a lymph node when the constraint term of the spatial attention position and its reasonable hyper-parameter are set.

Figure 7:
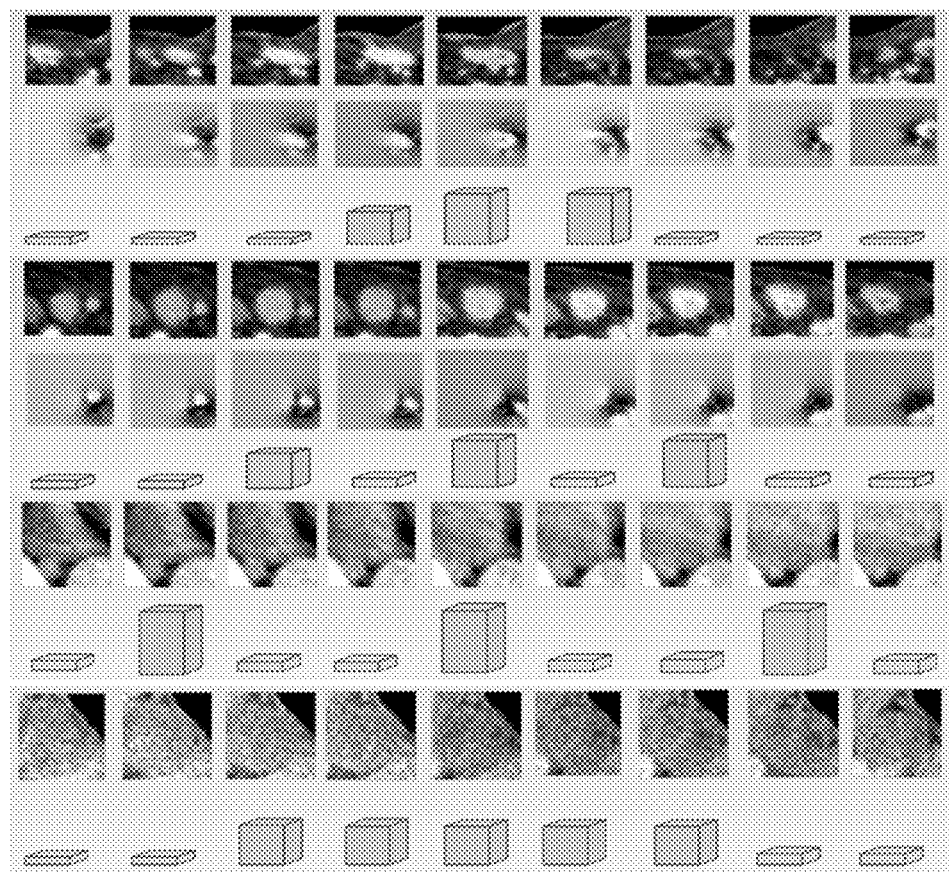
FIG. 7 is an instance diagram of performing a temporal attention mechanism.

FIG. 7 is an instance diagram of performing a temporal attention mechanism. In the Figure, the first two instances correspond to the true positive nodes and the last two instances correspond to the false positive nodes. The bar charts at the bottom are self-adaptive weight values predicted by the model for each slice in the sequence. Under the action of the constraint term of the temporal attention position, the model can accurately and self-adaptively located to a slice boundary corresponding to a different node size, thereby extracting context feature information relating to a lymph node.

Figure 8:
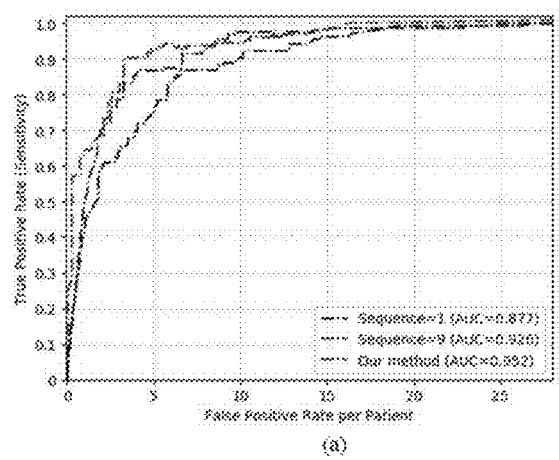
FIG. 8 is a diagram of comparison of FROCs and AUC of the present disclosure and a reference model.
Figure 8:
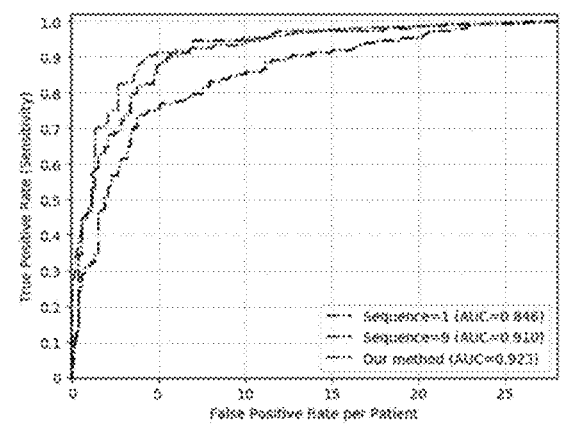

FIG. 8 is a diagram of comparison of FROCs and AUC of the present disclosure and a reference model. Herein, the reference model is a double-layer LSTM model without adopting the recurrent attention mechanism. For fair comparison, its structure is consistent with that of LSTM in step 4.1. Sequence=1 represents that the reference model can only extract the slices at the center of the lymph node and the model with a recurrence number T=1 is degraded into a classical CNN structure.

Sequence=1 represents that the reference model performs nine recurrences. It can be seen from the figure that FROCs and AUC in the present disclosure both perform optimally.

FIG. 9 is a diagram of performance comparison of the present disclosure and other models. In the table, those symbols with "*-H" represents that the input image size corresponds to a high resolution (256×256); "*-L" represents a low resolution (64×64); "*-RI" represents that the model is trained from the beginning; "*-TL" represents that the model parameters are migrated from the ImageNet data set. It can be seen from the table that the present disclosure has the highest accuracies in classification of both chest lymph nodes and celiac lymph nodes.

Of course, the above descriptions are not intended to limit the present disclosure and the present disclosure is also not limited to these examples. Any modification, changes, addition or replacements made by those skilled in the art within the essential scope of the present disclosure shall all fall in the scope of protection of the present disclosure.

The invention claimed is:

1. A CT lymph node detection system based on spatial-temporal recurrent attention mechanism, comprising a training sample extracting module, a deep layer feature extracting network, a feature embedding network, and a spatial-temporal recurrent attention target detection module, wherein a detection process includes the following steps:

at step 1, marking position coordinate information for the obtained lymph node dcm-format file and a corresponding lymph node by use of the training sample extracting module, and extracting a CT slice image block sequence $I_i$ (i=1,2, . . . ,L), $I_i \in \mathbb{R}^{W \times H}$, with CT slice image blocks being length L, width W and height H for each lymph node by using a pydicom module in python;

at step 2, extracting a high-level spatial feature map sequence corresponding to the CT slice image block sequence of each lymph node by using a VGG-16 model pre-trained by a natural image according to the deep layer feature extracting network and denoting the high-level spatial feature map sequence as $\{X_0, \ldots, X_L\}$;

at step 3, constructing the feature embedding network to perform dimension reduction for the input high-level feature map sequence and outputting a feature map $A_i$;

at step 4, constructing a spatial-temporal recurrent attention frame, and performing a spatial attention mechanism based on a recurrent neural network and the Gaussian Kernel Function to obtain a spatial attention result $g_S^{(t)}$;

wherein the step 4 comprises the following steps:

at step 4.1, constructing a long short-term memory network (LSTM) of two layers;

in the step 4.1, the recurrent neural network is constructed based on the long short-term memory network of two layers and a hidden layer is expressed as shown in the following formula (1):

$$h_t^{(1)} = R_{recur}(\hat{g}^{(t)}, h_{t-1}^{(1)} | W_{r1})$$

$$h_t^{(2)} = R_{recur}(h_t^{(1)}, h_{t-1}^{(2)} | W_{r2}) \quad (1)$$

wherein $R_{recur}(\bullet)$ corresponding to $h_t^{(1)}$ is expanded as shown in the following formula (2):

$$\begin{pmatrix} i_t \\ f_t \\ o_t \\ g_t \end{pmatrix} = \begin{pmatrix} \sigma \\ \sigma \\ \sigma \\ \tanh \end{pmatrix} M \begin{pmatrix} h_{t-1}, \\ \hat{g}^{(t)} \end{pmatrix}, \quad (2)$$

$$c_t = f_t \odot c_{t-1} + i_t \odot g_t,$$

$$h_t = o_t \odot \tanh(c_t)$$

wherein, $i_t$, $f_t$ and $o_t$ represent an input gate, a forget gate and an output gate respectively; $c_t$ and $h_t$ represent a cell state and a hidden layer state respectively; $\hat{g}^{(t)}$ represents a feature vector input into the long short-term memory network by the t-th step of attention mechanism; $M: \mathbb{R}^a \to \mathbb{R}^b$ is an affine transformation composed of trainable parameters, a=d+E, b=4d; d is the same vector dimension corresponding to $i_t$, $f_t$, $o_t$, $g_t$, $c_t$ and $h_t$, E is a dimension of an input feature subjected to dimension reduction, and $R_{recur}(\bullet)$ corresponding to $h_t^{(2)}$ is obtained by replacing $\hat{g}^{(t)}$ in the above $R_{recur}(\bullet)$ with $h_t^{(1)}$;

at step 4.2, initializing the state of the long short-term memory network by constructing an encoding process of the feature map;

wherein the step 4.2, specifically comprises the following steps:

at step 4.2.1, constructing a new double-layer long short-term memory network having the same structure as formula (1);

at step 4.2.2, dividing the feature map $A_{mid}$ corresponding to the exact center of a CT slice sequence of each lymph node at step 3 according to a spatial neighborhood;

specifically, dividing 8×8×200 into 16 sub-feature blocks with 2×2×200 based on adjacent four positions as one group; and at step 4.2.3, inputting the 16 sub-feature blocks into the new double-layer long short-term memory network sequentially clockwise from outside to inside to go through 16 cycles and obtain a cell state $c'_T{}^{(2)}$ corresponding to the second layer of the LSTM at the last moment so as to initialize the cell state of the second layer of the long short-term memory network at step 4.1;

at step 4.3, predicting a spatial attention position within a range of the feature map by using a sending network;

wherein the step 4.3 specifically comprises the following steps:

at step 4.3.1, concatenating a feature vector $h_t{}^{(2)}$ output by the first hidden layer of the long short-term memory network and a feature result $g_{S,Center}{}^{(t)}$ corresponding to the center of the slice sequence in the recurrent attention iteration step to obtain $[h_t{}^{(2)}, g_{S,Center}{}^{(t)}]$;

At step 4.3.2, inputting $[h_t{}^{(2)}, g_{S,Center}{}^{(t)}]$ to a sending network composed of one fully-connected layer to perform regression for the spatial attention position of the next recurrent iteration step as shown in the formula (3):

$$(\mu_S^{(t+1)}, \sigma_S^{(t+1)}) = \sigma(W_S[h_t^{(2)}, g_{S,Center}^{(t)}] + b_S) \quad (3)$$

wherein $\mu_S^{(t+1)} = (\mu_{S,x}^{(t+1)}, \mu_{S,y}^{(t+1)})$ represents an attention position coordinate predicted at the t+1 moment, where a variance $\sigma_S^{(t+1)}$ of the Gaussian Kernel Function is set to a fixed value 0.1, thus $W_S \in \mathbb{R}^{2 \times (R+E)}$, and $b_S \in \mathbb{R}^{2 \times 1}$ only corresponds to two output nodes;

wherein the step 4.4, after an attention position coordinate $\mu_S^{(t)}$ is obtained, an attention template matrix is constructed based on the two-dimension Gaussian Kernel Function and softmax as shown in the following formula (4):

$$l_i^{(t)} = p(L_t = i | \mu_S^{(t)}, \sigma_S^{(t)}) \quad (4)$$

$$= softmax(\phi(l_i | \mu_S^{(t)}, \sigma_S^{(t)}))$$

$$= \frac{\exp(\phi(l_i | \mu_S^{(t)}, \sigma_S^{(t)}))}{\sum_{j=1}^{K^2} \exp(\phi(l_j | \mu_S^{(t)}, \sigma_S^{(t)}))}$$

wherein $\phi(l_i | \mu_S^{(t)}, \sigma_S^{(t)}) = C \cdot \exp(l_i - \mu_S^{(t)})/2\sigma_S^{(t)}$, $l_i = \{(x_i, y_i)\}_{j=1}^{K \times K}$ is discrete equidistant position coordinates normalized to the interval [0, 1] within the range $A_1$; C is Gaussian normalized constant which is a fixed value 10;

at step 4.5, $l^{(t)}$ is multiplied by $A_t$ element by element and then added up so as to obtain the spatial attention result $g_S^{(t)}$;

at step 5, performing a temporal attention mechanism for the spatial attention result $g_S^{(t)}$ obtained at step 4 to obtain a spatial-temporal attention feature $\hat{g}^{(t)}$, wherein at step 5.1, constructing a mixture density network to predict an attention position $\mu_T^{(t)}$ of a slice direction;

at step 5.2, obtaining an attention weight vector $l'^{(t)}$ based on Gaussian Mixture Distribution; and at step 5.3, multiplying $l'^{(t)}$ by the input feature $g_S^{(t)}$ element by element and performing addition to obtain the spatial-temporal attention feature $\hat{g}^{(t)}$;

at step 6, predicting a lymph node positive score $\hat{y}_t$ of the recurrent attention iteration step by using the recurrent neural network constructed at step 4 in combination with the spatial-temporal attention feature $\hat{g}^{(t)}$ obtained at step 5;

at step 7, constructing a loss function of the model to perform steps 4-6 for T times, and performing supervised training for the model by using a gradient back propagation algorithm;

at step 8, performing iterative training for the model by repeating steps 3-7, until a trained model is obtained at the end of training; and at step 9, inputting the lymph node CT sequence to be detected to perform a model reasoning process, and taking a positive score $\hat{y}_T$ output by the final recurrent attention as a CT lymph node detection result, wherein the step 5.1 specifically comprises the following steps:

at step 5.1.1, equally dividing the sequence feature $g_S^{(t)}$ corresponding to each lymph node into left and right halves, that is, $g_{Left}^{(t)}$ and $g_{Right}^{(t)}$;

at step 5.1.2, forming the mixture density network by one fully-connected hidden layer to perform regression for the temporal attention position coordinate and the Mixture Gaussian Function parameters as shown in the following formula (5):

$$Z^{(t)} = \sigma(W_T g_{S/2}^{(t)} + b_T) \quad (5)$$

wherein $g_{S/2}^{(t)} \in \mathbb{R}^{E \cdot L/2}$ represents the left half or the right half of $g_S^{(t)}$; $W_T \in \mathbb{R}^{2C \times E \cdot L/2}$, $b_T \in \mathbb{R}^{2C \times 1}$ represents a training parameter of the mixture density network, C represents a component number of the Gaussian Mixture Model respectively corresponding to the left half and the right half of the sequence feature, and $\sigma$ is sigmoid function;

at step 5.1.3, distributing respective regression coefficients $Z_{Left}^{(t)} \in \mathbb{R}^{2C \times 1}$ and $Z_{Right}^{(t)} \in \mathbb{R}^{2C \times 1}$ of the left half and the right half to the Gaussian Mixture Model according to a rule of $Z_{0:\ C-1}^{(t)} \to \pi_T^{(t)}$ and $Z_{C:\ 2C-1}^{(t)} \to \mu_T^{(t)}$; and at step 5.1.4, with the formula (6), limiting $\mu_{Left}$ to [0, 0.5) and limiting $\mu_{Right}$ to (0.5, 1], $$\mu_{Left} \leftarrow \mu_{Left} \times 0.5, \mu_{Right} \leftarrow 0.5 \times (1 + \mu_{Right}) \quad (6).$$

2. The CT lymph node detection system according to claim 1, wherein the step 5.2 specifically comprises the following steps:

at step 5.2.1, normalizing the coefficient $\pi_T^{(t)}$ of each Gaussian component with softmax, that is, $\pi_T^{(t)} \leftarrow softmax(\pi_T^{(t)})$, and fixing a variance $\Sigma_T^{(t)}$ of all Gaussian components as 0.1;

at step 5.2.2, in combination with the Gaussian Mixture Model parameters $(\pi_T^{(t)}, \mu_T^{(t)}, \Sigma_T^{(t)})$ derived from the slice feature vectors of the left and right halves, a corresponding temporal attention weight vector $l'_i{}^{(t)}$ is obtained based on the formula (7):

$$l'^{(t)}_t = p\left(L_t = i | \pi_T^{(t)}, \mu_T^{(t)}, \sum_T^{(t)}\right) \quad (7)$$

$$= softmax\left(N\left(l_i | \pi_T^{(t)}, \mu_T^{(t)}, \sum_T^{(t)}\right)\right)$$

-continued $$= \frac{\exp\left(N\left(l_i \mid \pi_T^{(t)}, \mu_T^{(t)}, \sum_T^{(t)}\right)\right)}{\sum_{j=1}^{L} \exp\left(N\left(l_j \mid \pi_T^{(t)}, \mu_T^{(t)}, \sum_T^{(t)}\right)\right)}$$

wherein N is a Gaussian mixture density function;

$$N(l_i \mid \pi_T^{(t)}, \mu_T^{(t)}, \Sigma_T^{(t)}) = \sum_{c=1}^{C} \pi_{T,c}^{(t)} \phi_c(l_i, \mu_{T,c}^{(t)}, \Sigma_{T,c}^{(t)}),$$
$$s.t. \sum_{c=1}^{C} \pi_{T,c}^{(t)} = 1 \phi_c(l_i \mid \mu_{T,c}^{(t)}, \Sigma_{T,c}^{(t)}) = C \cdot \exp(l_i - \mu_{T,c}^{(t)}) / 2\Sigma_{T,c}^{(t)}$$ (8)

3. The CT lymph node detection system according to claim 1, wherein at step 7, a target function for the model to receive supervised training is obtained in the following steps:

at step 7.1, constructing a classification loss function; and investigating cross-entropy loss functions corresponding to all recurrent attention iteration steps as shown in the following formula (9):

$$F_c = -\sum_{t=1}^{T} \sum_{i=1}^{2} y_i \log \hat{y}_{t,i}$$ (9)

wherein $y_i$ and $\hat{y}_{t,i}$ are a real lymph node positive score and a predicted lymph node positive score, which are a total number of the recurrent attention iterations;

at step 7.2, constructing a constraint term of a predicted position of the spatial attention mechanism in the following two steps:

at step 7.2.1, constructing a "convergent" constraint term of the position, and constraining the predicted spatial attention position to around the center of the feature map based on Batch Normalization and the prior information of the lymph node being at the center of the slice, as shown in the following formula (10):

$$\min\left(\sum_{i=1}^{d}(\gamma_i - 1)^2 + \beta_i^2\right)$$ (10)

where $\hat{y}_i \leftarrow \gamma \hat{x}_i + \beta$, $(i = 1, \ldots, m)$, $$\hat{x}_i \leftarrow \frac{x_i - \mu_B}{\sqrt{\sigma_B^2 + \varepsilon}} \Leftrightarrow \hat{X} = A^T(X - B)$$

wherein β and γ are trainable parameters introduced by the Batch Normalization; d is an output dimension of the sending network; and m is a batch sample capacity;

at step 7.2.2, constructing a "divergent" constraint term of the position; and constructing the uniformly-distributed cross-entropy loss functions according to different positions predicted in the entire recurrent attention process, as shown in the following formula (11):

$$F_S = \text{Const} - \sum_{t=1}^{T} P_{Unif} \log[\text{softmax}(\mu_S^{(t)})]$$ (11)

wherein $P_{Unif}$~Uniform $(0, K^2)$ represents a uniform distribution within a spatial range of the feature map; the constant Const is set to 1;

at step 7.3, constructing a constraint term of a predicted position of the temporal attention mechanism; applying the "convergent" constraint term to the predicted position, further introducing the batch normalization layer to the mixture density network and minimizing the formula (10) so that the attention positions of the left and right halves in the direction of slice $\mu_T^{(t)l}$ ~(0.25, 0.75); and at step 7.4, constructing a final entire loss function of the model as shown in the following formula (12):

$$F = -\sum_{t=1}^{T}\sum_{i=1}^{2} y_i \log \hat{y}_{t,i} + \lambda_1\left(\sum_{i=1}^{d}(\gamma_i - 1)^2 + \beta_i^2\right) + \lambda_2\left(\text{Const} - \sum_{t=1}^{T} p_{Unif} \log[\text{softmax}(\mu_S^{(t)})]\right)$$ (12)

* * * * *